United States Patent
Yamazaki et al.

(10) Patent No.: US 7,561,300 B2
(45) Date of Patent: Jul. 14, 2009

(54) IMAGE INPUT/OUTPUT SYSTEM, IMAGE-PROCESSING METHOD AND PRINTER DRIVER

(75) Inventors: Masahito Yamazaki, Tokyo (JP); Masamichi Akashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 763 days.

(21) Appl. No.: 10/802,498

(22) Filed: Mar. 16, 2004

(65) Prior Publication Data
US 2004/0190026 A1 Sep. 30, 2004

(30) Foreign Application Priority Data
Mar. 28, 2003 (JP) ............... 2003/092821

(51) Int. Cl.
*G06F 15/00* (2006.01)

(52) U.S. Cl. ............... 358/1.9; 358/1.1; 358/1.13; 358/501; 358/518; 358/521; 358/401; 358/453; 358/462

(58) Field of Classification Search ............... 358/1.9, 358/462, 2.1, 453, 1.1, 521, 501, 518; 382/282, 382/173, 176, 167, 169, 270, 274
See application file for complete search history.

(56) References Cited

U.S. PATENT DOCUMENTS

| | | | | |
|---|---|---|---|---|
| 4,969,051 A | * | 11/1990 | Sasaki | 358/447 |
| 4,998,122 A | * | 3/1991 | Kanno et al. | 358/462 |
| 5,905,820 A | * | 5/1999 | Cushman et al. | 382/299 |
| 5,907,415 A | * | 5/1999 | Yabe | 358/518 |
| 5,973,802 A | * | 10/1999 | Hirota et al. | 358/521 |
| 6,339,477 B2 | * | 1/2002 | Mori | 358/1.14 |
| 6,882,447 B1 | * | 4/2005 | Nakajima et al. | 358/1.9 |
| 6,906,827 B1 | * | 6/2005 | Katayama | 358/1.9 |
| 7,254,270 B2 | * | 8/2007 | Simske | 382/224 |
| 7,268,914 B2 | * | 9/2007 | Noguchi et al. | 358/1.9 |
| 2002/0025079 A1 | * | 2/2002 | Kuwata et al. | 382/254 |

FOREIGN PATENT DOCUMENTS

| | | |
|---|---|---|
| JP | 08-234947 A | 9/1996 |
| JP | 09-006940 A | 1/1997 |
| JP | 10-336438 A | 12/1998 |
| JP | 2001-282480 A | 10/2001 |

* cited by examiner

*Primary Examiner*—Twyler L Haskins
*Assistant Examiner*—Dennis Dicker
(74) *Attorney, Agent, or Firm*—Canon U.S.A. Inc., I.P. Division

(57) ABSTRACT

An image input/output system obtains a print-job that includes printing-mode information and print-data, and analyzes the printing-mode information to determine whether the output mode of the print-data is a high-contrast output mode or a low-contrast output mode. According to the determined output mode, the image-processing device generates image data by calculating the color-space conversion of the print-data at a high bit-depth if the output mode is high-contrast, or at a low bit-depth if the output mode is low-contrast, thereby achieving output with high reproducibility in a high-contrast output mode, and high-speed output in a low-contrast output mode.

4 Claims, 7 Drawing Sheets

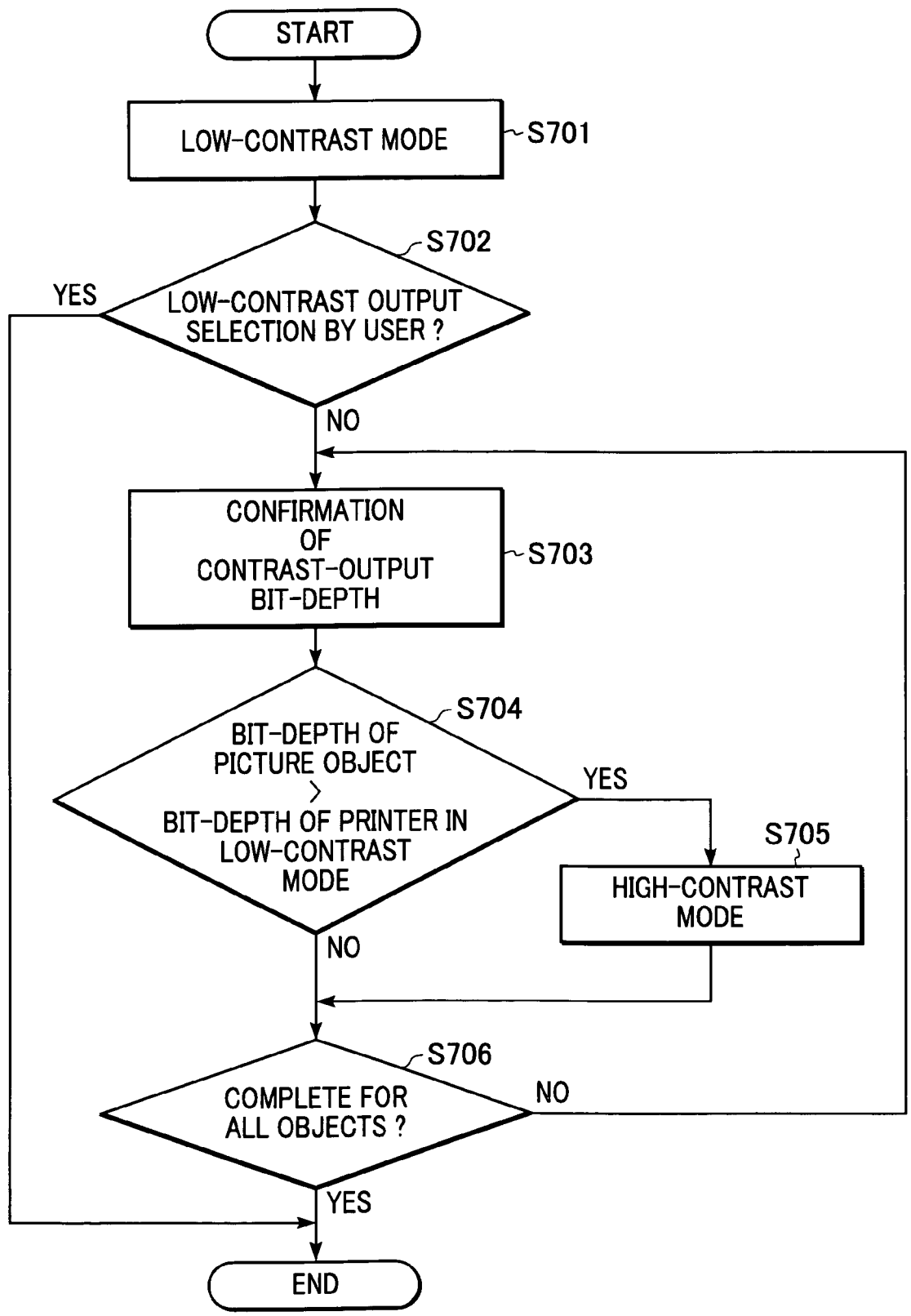

IMAGE INPUT/OUTPUT SYSTEM, IMAGE-PROCESSING METHOD AND PRINTER DRIVER

CROSS-REFERENCES TO RELATED APPLICATIONS

This application claims the benefit of Japanese Application 2003-092821, filed Mar. 28, 2003.

BACKGROUND OF THE INVENTION

1. Field of the Invention

The present invention relates to image input/output systems, image-processing methods, and printer drivers.

2. Description of the Related Art

In known image-processing devices, such as color copiers and color printers, a developing unit that uses black toner or black ink is solely driven during the development of monochrome pages so as to save color toner and color ink and also to achieve a simple development process for high-speed output.

Furthermore, cheaper image-processing devices, such as low-end color copiers and color printers, are provided with independent developing units for black toner and color toner. In some devices, when only the black toner is used for the paper output, the color-toner developing unit is not driven so as to achieve high-speed output.

However, regardless of whether an input print-job is monochrome or color, known image-processing devices perform the same color-space conversion calculation for a print-job with a specific color-space conversion profile. For this reason, the color-space-conversion calculation may interfere with the achievement of high-speed quality demanded in monochrome printing, thus lowering the output speed for monochrome output and requiring expensive high-speed CPUs.

SUMMARY OF THE INVENTION

An aspect of the present invention is to provide an image input/output system, an image-processing method, and a printer driver that achieve output with high reproducibility in a high-contrast output mode, and high-speed output in a low-contrast output mode.

According to one aspect of the present invention, an image input/output system is provided. The image input/output system includes: obtaining means for obtaining a print-job that includes printing-mode information and print-data; analyzing means for analyzing the printing-mode information to determine whether the output mode of the print-data is a high-contrast output mode or a low-contrast output mode; generating means for generating image data according to the determined output mode, the image data in the high-contrast output mode being generated by calculating color-space conversion of the print-data at a high bit-depth, the image data in the low-contrast output mode being generated by calculating the color-space conversion of the print-data at a low bit-depth.

In accordance with another aspect of the present invention, the image input/output system may include output means for outputting the image data on a medium.

In accordance with another aspect of the present invention, the generating means of the image input/output system may generate an intermediate picture object by calculating the color-space conversion of the print-data. The intermediate picture object may be stored. The image data may be generated by calculating the color-space conversion of the stored intermediate picture object.

In accordance with yet another aspect of the present invention, the analyzing means of the image input/output system may include: first setting means for setting the output mode to the low-contrast mode if the printing-mode information includes a monochrome-output command; and second setting means for setting the output mode to the high-contrast mode if the printing-mode information includes a color-output command and the print-data includes at least one picture object for color-output.

In accordance with still another aspect of the present invention, the image input/output system may include: setting means for setting a processing bit-depth for color-space conversion calculation; and selecting means for selecting one of multiple contrast-output modes including the high-contrast output mode and the low-contrast output mode.

According to another aspect of the present invention, a printer driver is provided. The printer driver operates in a terminal connectable to the image input/output system. The printer driver generates the print-job output to the image input/output system. The printer driver includes: selection means for allowing a user to select contrast properties; and adding means for adding the contrast properties to the print-data to generate the print-job.

In accordance with another aspect of the present invention, the printer driver may include determining means for determining the presence of a picture object for color-output in the print-data, wherein the adding means adds high-contrast properties to the print-data if the picture object for color-output is present in the print-data, and adds low-contrast properties to the print-data if the picture object for color-output is not present in the print-data.

In accordance with yet another aspect of the present invention, the printer driver may include: examining means for examining an output bit-depth of a picture object in the print-data; and comparing means for comparing the output bit-depth of the picture object with the processing bit-depth of the image input/output system in the low-contrast output mode, wherein the adding means adds high-contrast properties to the print-data if the output bit-depth of the print-data is higher than the processing bit-depth and adds low-contrast properties to the print-data if the output bit-depth of the print-data is not higher than the processing bit-depth.

In accordance with still another aspect of the present invention, a printer driver which operates in a terminal connectable to the image input/output system and generates the print-job output to the image input/output system may include: low-contrast setting means for setting an output mode of print-data to be output to the image input/output system to a low-contrast mode; high-contrast setting means for setting the output mode of print-data to be output to the image-processing device to a high-contrast mode if monochrome output was not selected for the print-data and at least one of the picture objects included in the print-data is a color object; low-contrast generating means for generating printing-mode information having information for low-contrast output mode if the output mode of the print-data to be output by the image input/output system is the low-contrast mode; high-contrast generating means for generating printing-mode information having information for high-contrast output mode if the output mode of the print-data to be output by the image input/output system is the high-contrast mode; and print generating means for generating the print-job that includes the print-data and the printing-mode information generated by the low-contrast generating means and the high-contrast generating means.

According to another aspect of the present invention, an image input/output system is disclosed. The image input/ output system includes: obtaining means for obtaining a print-job that includes print-data; analyzing means for analyzing the print-data to determine the presence of a picture object for color-output in the print-data; and generating means for generating image data by calculating color-space conversion for the print-data at a high bit-depth if the presence of the picture object for color-output is determined and by calculating the color-space conversion at a low bit-depth if the presence of the picture object for color-output is not determined.

In accordance with another aspect of the invention, the image input/output system may include generating means for generating the image data without calculating the color-space conversion for the print-data if the picture object in the print-data is to be rendered by a predetermined property and color.

According to another aspect of the present invention, an image input/output system may include: obtaining means for obtaining a print-job that includes print-data; examining means for examining an output bit-depth of a picture object in the print-data by analyzing the print-data; comparing means for comparing the output bit-depth of the picture object with a processing bit-depth of the image input/output system in a low-contrast output mode; and generating means for generating image data by calculating color-space conversion for the print-data at a low bit-depth when the output bit-depth of the picture object is lower than the processing bit-depth of the image input/output system in the low-contrast output mode.

According to yet another aspect of the invention, an image-processing method is disclosed. The method includes the steps of: obtaining a print-job which includes printing-mode information and print-data; analyzing the printing-mode information to determine whether an output mode of the print-data is a high-contrast output mode or a low-contrast output mode; if the output mode of the print-data is the high-contrast output mode, generating image data by calculating color-space conversion of the print-data at a high bit-depth; and if the output mode of the print-data is the low-contrast output mode, generating the image data by calculating the color-space conversion of the print-data at a low bit-depth.

In accordance with another aspect of the present invention, the print-data may include contrast properties selected by a user.

According to another aspect of the present invention, a method for generating a print-job is disclosed. The method includes the steps of: setting an output mode of print-data to a low-contrast output mode, the print-data being output by an image input/output system; generating printing-mode information having information for the low-contrast output mode if monochrome output is selected for a picture object of the print-data to be output by the image input/output system; generating printing-mode information having information for the high-contrast output mode if color output is selected for picture objects to be output by the image input/output system and if at least one of the picture objects included in the print-data is a color object; and generating the print-job that includes the printing-mode information and the print-data.

According to yet another aspect of the invention, a program may be provided in a computer. The program includes: an obtaining procedure for obtaining a print-job that includes printing-mode information and print-data; an analyzing procedure for analyzing the printing-mode information to determine whether an output mode of the print-data is a high-contrast output mode or a low-contrast output mode; a generating procedure for generating image data according to the determined output mode, the image data in the high-contrast output mode being generated by calculating color-space conversion of the print-data at a high bit-depth, the image data in the low-contrast output mode being generated by calculating the color-space conversion of the print-data at a low bit-depth; and an output procedure for outputting the image data.

A recording medium which is readable by a computer may store the program.

Further objects, features and advantages of the present invention will become apparent from the following description of the preferred embodiments with reference to the attached drawings.

BRIEF DESCRIPTION OF THE DRAWINGS

FIG. 7 is a flow chart illustrating another example of a switching operation between a high-contrast output mode and a low-contrast output mode in the system 100 performed by a printer driver of one of the host computers 401 and 402 according to a second embodiment.

DESCRIPTION OF THE PREFERRED EMBODIMENTS

Embodiments of the present invention will now be described with reference to the drawings. An image-processing device of the present invention and a printer driver for generating print-jobs output to the image-processing device will be described in detail.

First Embodiment

Figure 1:
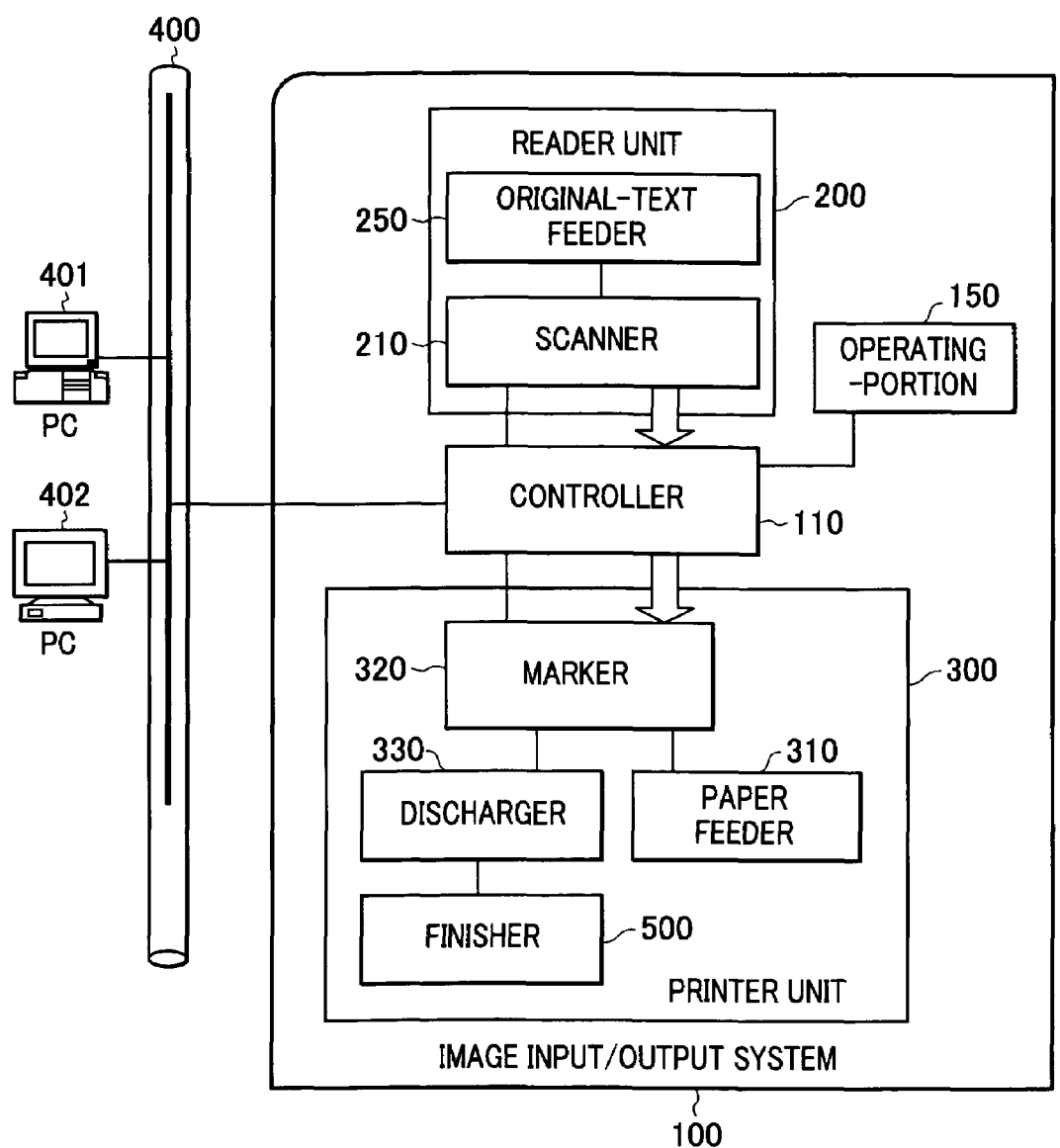
FIG. 1 is a block diagram of an image input/output system including a controller, a reader unit and a printer unit, and connectable to one or more host computers according to a first embodiment.

FIG. 1 is a block diagram of an image input/output system 100 including an image-processing device according to a first embodiment.

The image input/output system 100 includes: a reader unit 200 functioning as an image-input device; a printer unit 300 functioning as an image-processing device; a controller 110 that electrically connects and controls the reader unit 200 and the printer unit 300; and an operating portion 150 that is used by a user for operating the system 100. Furthermore, the system 100 is connected with, for example, host computers 401 and 402 through a network 400 (such as a local area network (LAN)), and is capable of sending and receiving data.

The reader unit 200 optically scans the original image and converts the scanned image to image data. The reader unit 200 includes a scanner 210 for scanning the original image, and an original-text feeder 250 for feeding originals.

The printer unit 300 feeds recording paper, prints the image data as a visual image on the recording paper, and then outputs the paper. The printer unit 300 includes: a paper-feeder 310 which carries cassettes with various types of recording paper; a marker 320 for transferring and fixing the image data on the recording paper; a discharger 330 for outputting the printed paper; and a finisher 500 having stapler and sorter functions.

The controller 110 provides a copier function by commanding the reader unit 200 to read image data of the original and then controlling the printer unit 300 to output the image data on recording paper. Furthermore, the controller 110 provides a scanner function by converting the image data read out by the reader unit 200 to coded data and then sending the coded data to, for example, the host computers 401 and 402 via the network 400, such as a LAN. The controller 110 further provides a printer function by converting coded data received from, for example, the host computers 401 and 402 via the network 400 to image data and then outputting the image data to the printer unit 300.

The operating portion 150 is connected to the controller 110 and has, for example, a liquid-crystal touch-screen panel to provide a user interface for operating the image input/output system 100.

Figure 2:
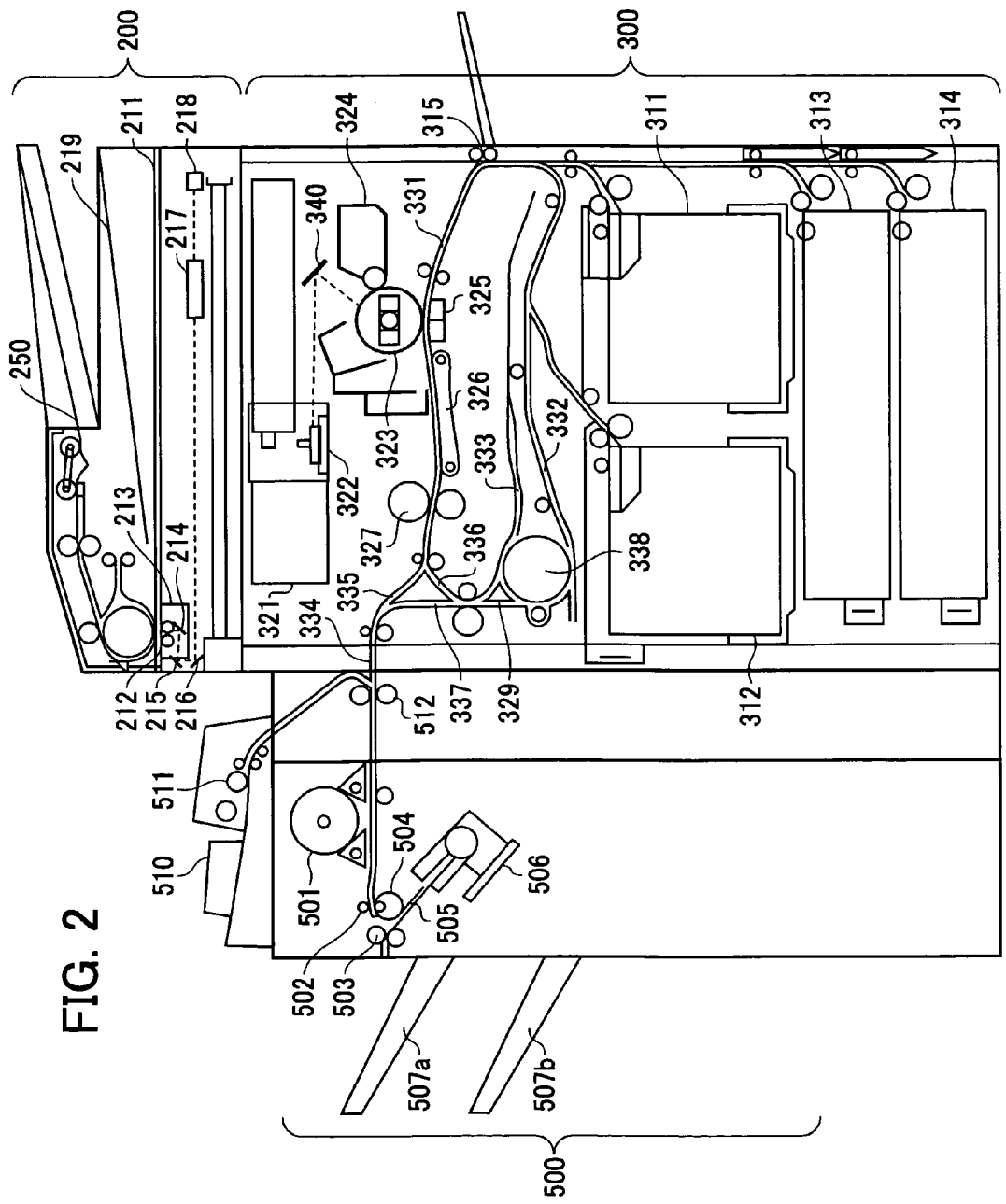
FIG. 2 is a cross-sectional view showing an example of the reader unit and the printer unit of the image input/output system according to the first embodiment.

FIG. 2 is a cross-sectional view showing an example of the reader unit 200 and the printer unit 300 of the system 100.

The original-text feeder 250 in the reader unit 200 feeds originals one by one from the beginning onto platen glass 211. After each scanning of the originals is completed, the original placed on the platen glass 211 is output to an output tray 219. When each of the originals is transferred to the platen glass 211, a lamp 212 is lit and an optical component 213 starts moving to photo-scan the original. The reflected light from the original during the photo-scanning is directed towards a CCD (charge coupled device) image sensor 218 (referred to as CCD 218 hereinafter) via mirrors 214, 215, and 216 and a lens 217. The scanned original image is thus read out by the CCD 218. The image data output from the CCD 218 undergoes a specific treatment and is sent to the controller 110, which is not shown in FIG. 2.

The printer unit 300 includes a laser-driver 321 for driving a laser-emitter 322. The laser-emitter 322 emits a laser beam corresponding to the image data output from the controller 110. The laser beam is directed towards a photo-receptor drum 323 by a mirror 340 to form a latent image of the laser beam on the drum 323. A developing solution is applied to the latent image on the drum 323 from a developer container 324. If CMYK-color (cyan-magenta-yellow-key-color) output is permissible, the following structures are possible: multiple developer containers for applying four different kinds of developing solutions to a single drum, a set of four photo-receptor drums and a set of four developer containers, or a single photo-receptor drum and three developer containers for CMY-development and a single drum and a single container for K-development.

In synchronization with the timing of the start of the laser-beam irradiation, recording paper is fed from either a cassette 311, a cassette 312, a cassette 313, a cassette 314, or a manual paper-feeder 315. The paper is then carried through a conveying path 331 to reach a transfer component 325 for transferring the developing solution applied on the photoreceptor drum 323 to the paper. The recording paper with the developing solution is then carried on a conveying belt 326 to a fixing component 327 where the developing solution is fixed to the paper by heat and pressure applied by the component 327. After passing through the component 327, the paper is carried through conveying paths 335 and 334 to be discharged. Alternatively, to output the paper on the reverse side of its printed face, the paper may be directed to conveying paths 336 and 338 from where the paper is conveyed in the reverse direction so as to be discharged through conveying paths 337 and 334.

For double-sided recording, after passing through the fixing component 327, the paper is carried through the conveying path 336 and a flapper 329 to reach a conveying path 333 from where the paper is conveyed in the reverse direction. The flapper 329 leads the paper towards the conveying path 338 and then to a conveying path 332 for re-feeding of the paper. After reaching the conveying path 332, the paper travels through the conveying path 331 at the timing of the laser-beam irradiation and is carried to the transfer component 325.

On the other hand, the recording paper exiting from the conveying path 334 is carried to the finisher 500. The paper is first sent to a buffer 501 where, in some cases, the paper is buffered by being rolled around a buffer roller. For instance, if subsequent processes, such as stapling, takes time, utilizing the buffer 501 may maintain a constant conveying rate of the paper sent from the printer unit 300, thus contributing to an improvement of the throughput. The recording paper is then discharged to a stack tray 507a by first twin-rollers 502 and second twin-rollers 503.

Figure 3:
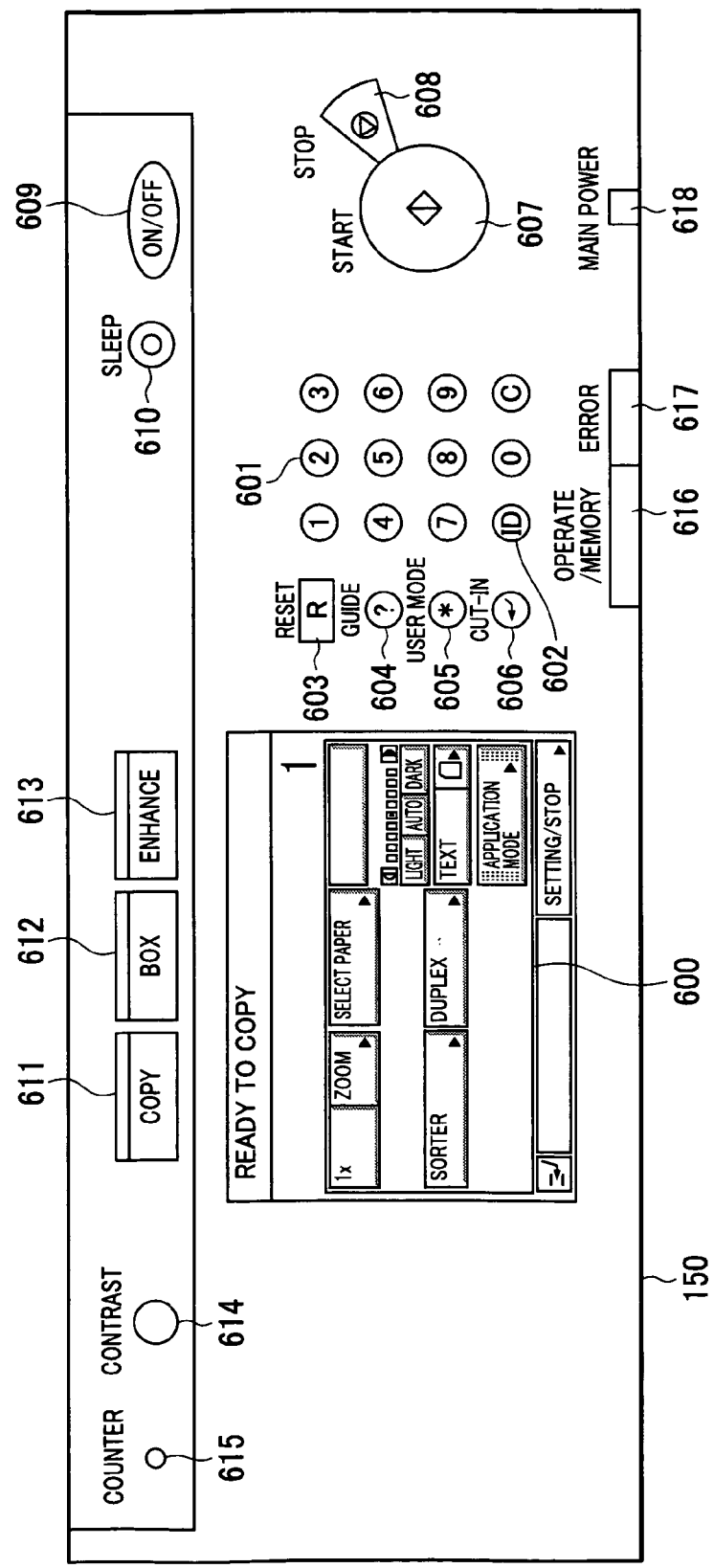
FIG. 3 is a schematic diagram illustrating an operating portion in the image input/output system according to the first embodiment.

FIG. 3 is a schematic diagram illustrating the operating portion 150 in the image input/output system 100 according to the first embodiment.

The operating portion 150 includes an LCD touch-screen panel 600 for, for example, mode selections and setup displays; numerical keys 601 of numerals 0 to 9 for numerical inputs; and an ID key 602 which is used by, for example, an administrator for inputting, for example, department codes or security codes in a case where the system 100 is administered by each department.

The operating portion 150 further includes a reset key 603 for resetting the setup mode; a guide key 604 for displaying the guidance (help) screen of each mode; a user mode key 605 for displaying the user-mode screen; and a cut-in key 606 for performing interruption-copying.

The operating portion 150 further includes a start key 607 for starting the copying operation, and a stop key 608 for terminating the copying operation in progress.

Furthermore, the operating portion 150 includes a soft-power switch 609 which may be pressed to turn off the backlight of the LCD touch-screen panel 600 so that the system 100 is switched to a power-saving mode, and a sleep key 610 which may be pressed to enter the sleep mode and pressed again to exit the sleep mode.

Furthermore, function keys 611, 612, and 613 are provided for selecting among copy, box, and enhancement functions, respectively. In FIG. 3, the basic screen of the copy mode is being shown. By pressing one of the other function keys (box function key 612 and enhance function key 613), the basic screen of the selected function mode is displayed.

A screen-contrast key 614 is further provided for adjusting the contrast of the touch-screen panel 600. Furthermore, the operating portion 150 includes a counter key 615 which may be pressed to display a counter screen on the touch-screen panel 600 to show the total number of copy sheets used.

The operating portion 150 further includes an LED 616 for indicating that an image is being stored into an image memory in the process of a copying operation; an error-LED 617 which indicates that the system 100 is in an error mode, such as a paper jam or unclosed doors; and a power-LED 618 which indicates that the main switch of the system 100 is in the ON mode.

Figure 4:
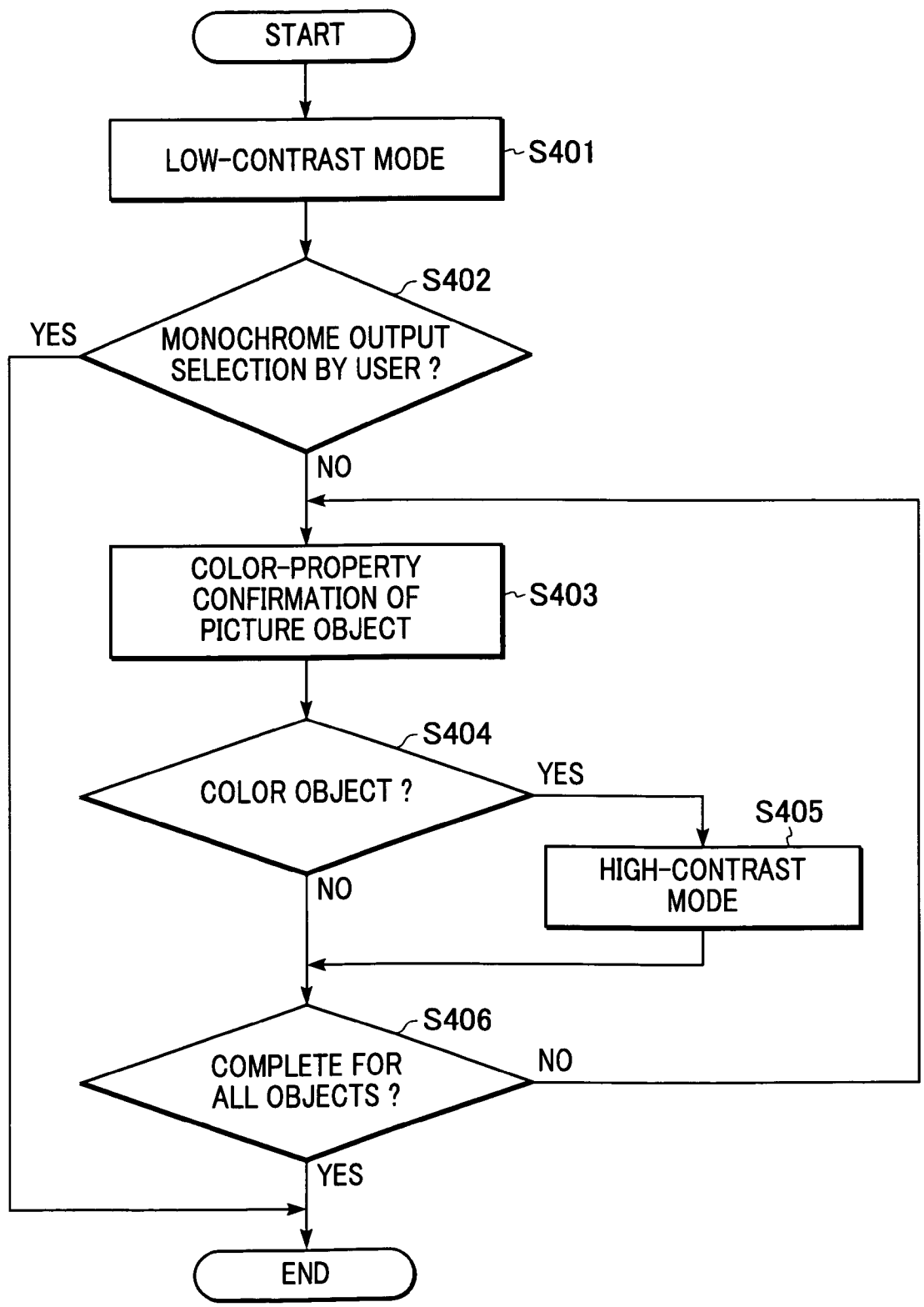
FIG. 4 is a flow chart illustrating an example of a switching operation between a high-contrast output mode and a low-contrast output mode in the system 100 performed by a printer driver of one of host computers 401 and 402 according to the first embodiment.

FIG. 4 is a flow chart illustrating an example of a switching operation between a high-contrast output mode and a low-contrast output mode in the image input/output system 100 performed by a printer driver of one of the host computers 401 and 402 according to the first embodiment.

In step S401, the printer driver sets the output mode of the system 100 to a low-contrast output mode. In step S402, it is determined whether the user has selected "monochrome output" on the user interface of the printer driver. If it is determined that the user has selected the "monochrome output" (YES), the operation ends and the printer driver remains in the low-contrast output mode. On the other hand, if it is determined that the user has not selected "monochrome output" or it is determined that the user has selected "color output" (NO), the operation proceeds to step S403 where the color property of one of picture objects of data is confirmed.

In step S404, it is determined whether the confirmed picture object is a color object. If it is determined that the picture object is a color object (YES), the operation proceeds to step S405 where the output mode of the printer driver is switched to the high-contrast output mode. On the other hand, if it is determined that the picture object is not a color object (NO), the operation proceeds to step S406 for determining whether color-property confirmation for all picture objects has been completed. If the color-property confirmation for all picture objects is not completed (NO), the operation returns to step S403 to repeat the process until the color-property confirmation for all objects is completed. In step S406, when the confirmation for all objects is completed (YES), the current contrast-output mode is determined as the output mode of the printer driver. If and when it is determined that a color picture object has been confirmed (YES in step S404), and the output mode of the printer driver has been switched to the high-contrast output mode (step S405), there is no need to continue checking the remaining objects, i.e., the operation can terminate rather than move to S406. As an example of the contrast-output modes of the first embodiment, the high-contrast output mode has a 12-bit-depth for color conversion, whereas the low-contrast output mode has an 8-bit-depth for color conversion.

Depending on the determined output mode of the printer driver, the printer driver switches to an operation for generating PDL-data processable by the printer unit 300 of the image input/output system 100. In other words, in the first embodiment, the PDL-data generated in the high-contrast output mode is given a 12-bit-depth color property. With the production of the PDL-data, parameter information is produced as information for the "high-contrast output mode" and is added to the PDL-data. On the other hand, the PDL-data generated in the low-contrast output mode is given an 8-bit-depth color property. Likewise, with the production of the PDL-data, parameter information is produced as information for the "low-contrast output mode" and is added to the PDL-data.

Figure 5:
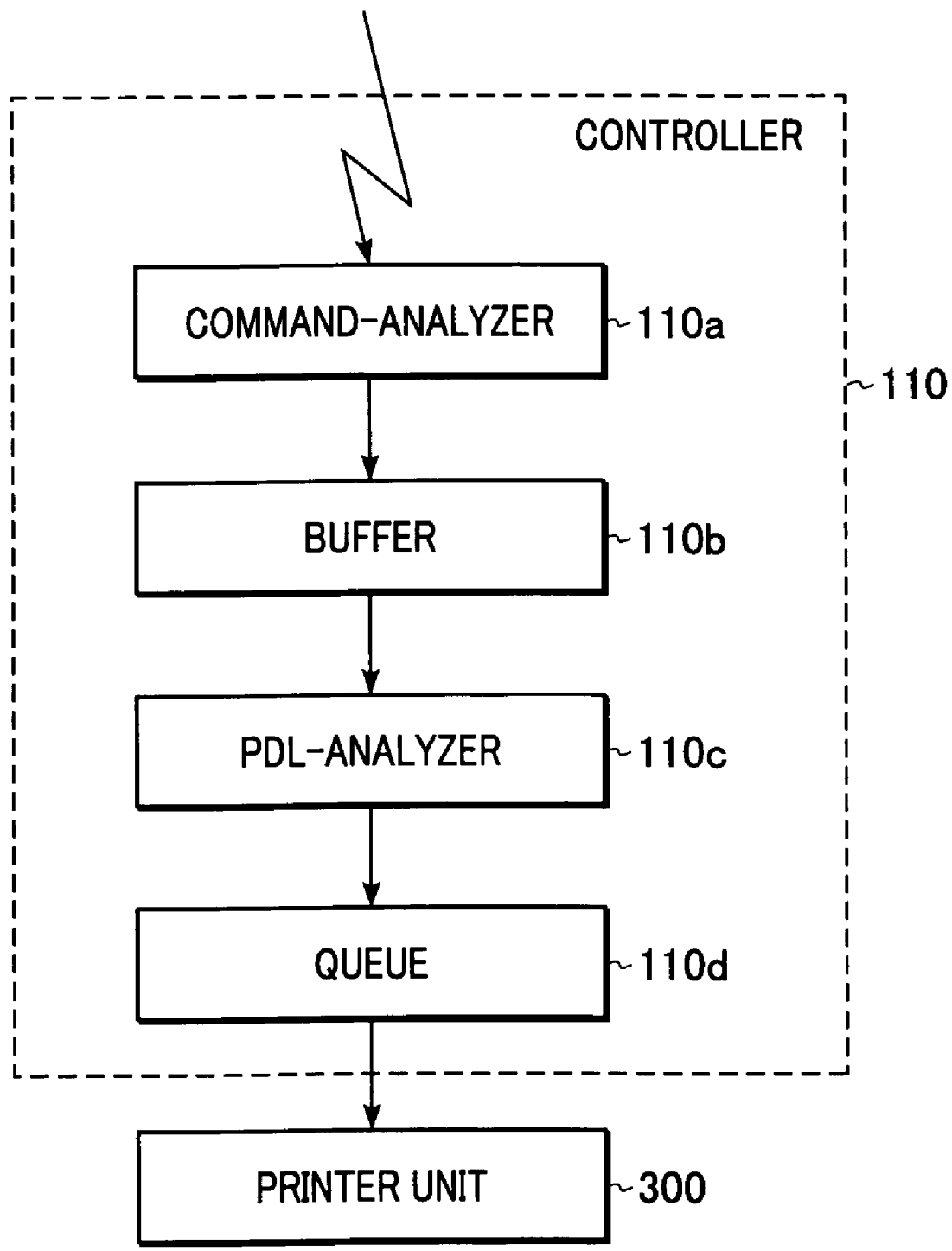
FIG. 5 is a block diagram illustrating further detail of the controller 110 of the system 100 shown in FIG. 1.

FIG. 5 is a block diagram illustrating in further detail the controller 110 of the system 100 shown in FIG. 1. In FIG. 5, a command-analyzer 110a analyzes data, i.e. print-job commands, in sequence received from, for example, host computers 401 and 402 via the network 400. The parameter information in the analyzed data is sent to a PDL-analyzer 110c of the subsequent process. The parameter information includes information for the contrast-output mode described above and determines the operation of the PDL-analyzer 110c.

Furthermore, a reception buffer 110b is provided for temporarily storing actual output data in the analyzed data of the command-analyzer 110a.

Furthermore, the PDL-analyzer 110c processes the print information (PDL-data), which is stored in the reception buffer 110b and is intended for actual outputting, to printable image data. In that case, if the contrast-output mode analyzed by the command-analyzer 110a is "high-contrast output mode", a 12-bit-width is applied for parameters or conversion table sizes for color conversions within the internal parameter of the PDL-analyzer 110c. On the other hand, if the contrast-output mode is "low-contrast output mode", an 8-bit-width is applied for parameters or conversion table sizes for color conversions.

In other words, to initialize the entire conversion table in the high-contrast output mode, 4,096 parameter-initializations must be performed, whereas the low-contrast output mode only requires 256 parameter-initialization-loops. Similarly, for rewriting of the conversion table, the low-contrast output mode requires a much lower number of loops and thus greatly reduces the amount of work required.

A queue 110d is provided for sequentially storing information that is to be sent to the printer unit 300. The printer unit 300 performs the actual printing, that is, transferring print-jobs sequentially stored in the queue 110d to the recording paper.

In other words, in the image-processing device (image input/output system 100) of the first embodiment, the controller 110 receives a print-job including printing-mode information and print-data, stores the print-data in the buffer 110b, analyzes the printing-mode information in the command-analyzer 110a, and determines whether the output mode of the print-data is a high-contrast output mode or a low-contrast output mode. According to the determined output mode, the color-space conversion of the print-data stored in the buffer 110b is calculated by the PDL-analyzer 110c. The color-space conversion is calculated at a high bit-depth in the high-contrast output mode, whereas in the low-contrast output mode, the color-space conversion is calculated at a low bit-depth. Image data is generated and is stored in the queue 110d. This image data is then output onto a medium by the printer unit 300.

Furthermore, the command-analyzer 110a of the image input/output system 100 sets the output mode to the low-contrast output mode if the printing-mode information includes monochrome-output information, and to the high-contrast output mode if the printing-mode information includes color-output information.

On the other hand, as described previously, the print-job data is generated by, for example, the host computers 401 and 402. In other words, the host computers 401 and 402, for example, function as data-generating means.

The print-job data can be classified mainly into three properties which are: (1) data for managing a print-job, (2) document data for printing, and (3) data for controlling the printing process. Each of the properties is described by command information. To each piece of command information, a corresponding piece of header information is added such that the header information and the command information form a pair. Accordingly, the print-job data includes a pair of or a combination of multiple pairs of header information and command information.

Figure 6:
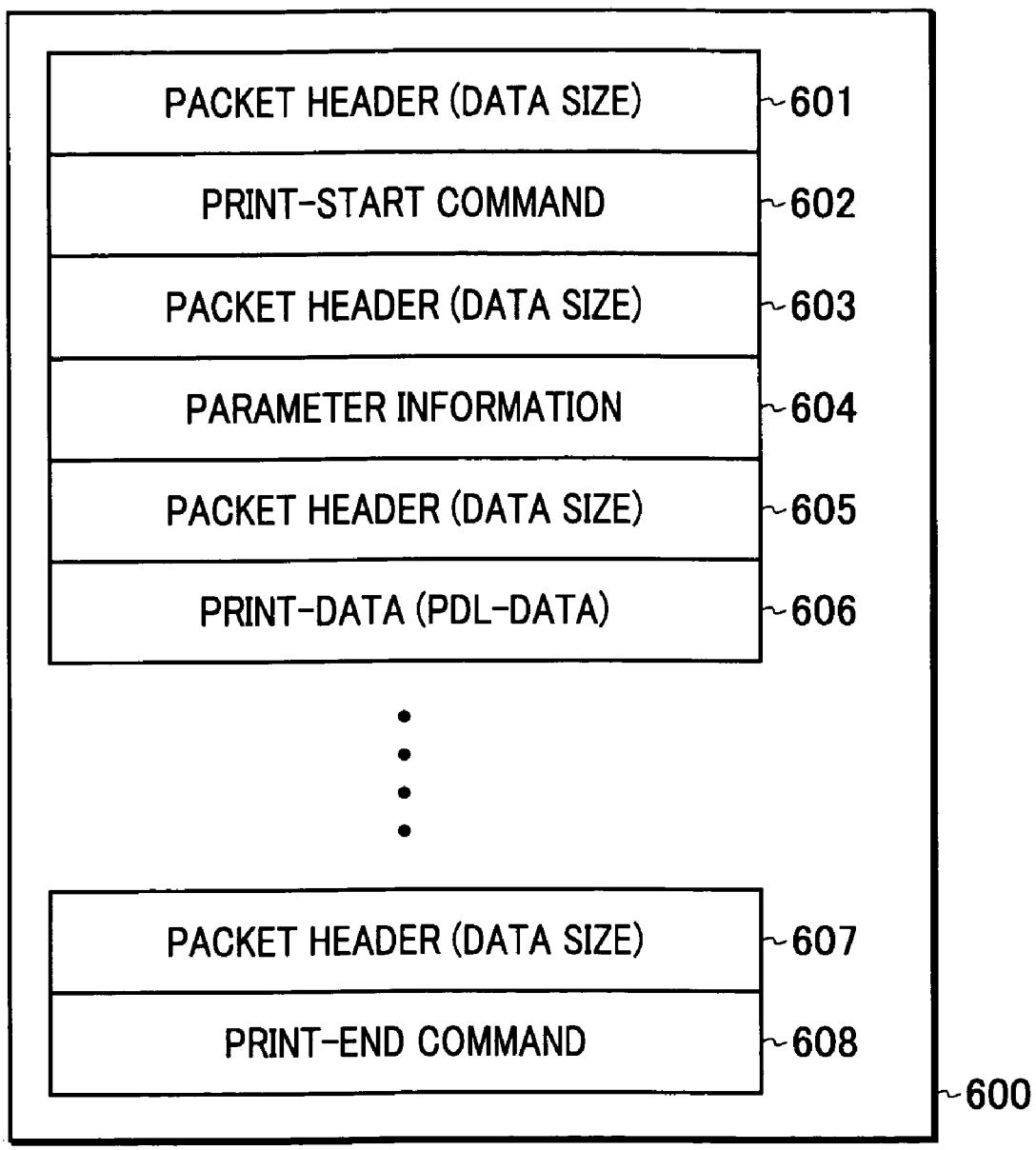
FIG. 6 is a diagram showing an example of print-data received by the system 100 from, for example, one of the host computers 401 and 402 according to the first embodiment.

FIG. 6 is a diagram showing an example of print-data received by the image input/output system 100 from, for example, one of the host computers 401 and 402 according to the first embodiment. Referring to FIG. 6, a job-command group 600 is a series of commands for a single printing process. Furthermore, a packet header 601 stores data size for a start command 602. The start command 602 indicates the start of a print-job. The commands from the start command 602 to an end command 608, which will be described later, form data for managing a single print-job.

A packet header 603 stores data size for a set-up command of parameter information 604. The parameter information 604 consists of a parameter set-up command and parameter set-up data. The set-up data includes the information for the contrast-output mode.

A packet header 605 stores data size for print-data 606 which is data (PDL-data) for the actual printing.

A packet header 607 stores data size for an end command 608. The end command 608 indicates the end of a print-job. The start command 602 and the end command 608 identify information for each print-job.

Accordingly, the job-command group 600 is a body of data that includes packet headers and parameters and is sent and received in packet units. The term "packet" refers to the general concept of a body of data, and not to a specific concept in which the term is used in data communications of network. The information from the start command 602 to the end command 608 is defined as one print-job unit.

In other words, in the printer driver of the first embodiment that operates in a terminal connectable to the image input/output system 100, such as the host computers 401 and 402 connected to the image input/output system 100 via the network 400, includes capabilities for performing the following functions: setting the output mode of the print-data to a low-contrast output mode, the print-data being output to the device; generating printing-mode information having information for low-contrast output mode if monochrome output is selected for the picture objects of the print-data to be output by the image input/output system; generating printing-mode information having information for high-contrast output mode if color output is selected for the picture objects to be output by the image input/output system, and if at least one of the picture objects included in the print-data is a color object; and generating a print-job that includes the print-data and the generated printing-mode information.

As described previously, the printer driver that operates and generates print-job data in a host computer connected to the image input/output system 100 of the first embodiment allows the user to select the contrast properties of the print-job data. Furthermore, the printer driver determines the presence of an object for color-output in the print-job data so as to add high-contrast properties if the object for color output is present or to add low-contrast properties if the color output object is not present.

In other words, the printer driver that operates and generates print-jobs in, for example, one of the host computers 401 and 402 connected to the image input/output system 100 of the first embodiment includes capabilities for performing the functions of: allowing the user to select contrast properties; and adding the contrast properties to the print-data to generate a print-job.

Furthermore, the printer driver determines the presence of a picture object for color-output in the print-data. If the presence is confirmed, high-contrast properties are added to the print-data, whereas if the picture object for color-output is not present, low-contrast properties are added to the print-data.

Furthermore, the printer driver examines the output bit-depth of the picture object in the print-data and compares the output bit-depth with the processing bit-depth of the system 100 in a low-contrast output mode. Thus, if the output bit-depth of the print-data is lower than the processing bit-depth, low-contrast properties are given to the print-data.

Second Embodiment

FIG. 7 is a flow chart illustrating another example of a switching operation between a high-contrast, output mode and a low-contrast output mode in the image input/output system 100 performed by a printer driver of one of the host computers 401 and 402 according to a second embodiment.

In step S701, the printer driver sets the output mode to a low-contrast output mode. In step S702, it is determined whether the user has selected "low-contrast output" on the user interface of the printer driver. Although not shown in the drawing, the user interface displays "low-contrast output" (high-speed output) and "high-contrast output" between which the user may select.

If it is determined that the user has selected the "low-contrast output" (YES), the operation ends and the printer driver remains in the low-contrast output mode. On the other hand, if it is determined that the user has selected the "high-contrast output" (NO), the operation proceeds to step S703 where the contrast-output bit-depth of one of picture objects in data is confirmed. In step S704, it is determined whether the confirmed contrast-output bit-depth of the picture object is larger than the bit-depth, for example, when the printer unit 300 is functioning as the image-processing device it is determined whether the confirmed-output bit-depth of the picture object is larger than the 8 bit-depth of the printer unit 300 in the low-contrast output mode.

If it is determined that the contrast-output bit-depth is larger than the 8-bit-depth of the printer unit 300 in the low-contrast output mode (YES), the operation proceeds to step S705 where the output mode of the printer driver is switched to the high-contrast output mode. As shown in FIG. 7, step S706 (described below) can then be performed. However, the operation can terminate after step S705 regardless of whether the operation has been completed for all objects because once the printer driver has been switched to high-contrast mode, there is no need to check the remaining picture objects. On the other hand, in step S704, if it is determined that the contrast-output bit-depth is not larger than the 8-bit-depth of the printer unit 300 in the low-contrast output mode (NO), the operation proceeds directly to step S706.

Step S706 is a step for determining whether the contrast-output bit-depth confirmation for all picture objects has been completed. If the confirmation for all picture objects is not completed (NO), the operation returns to step S703 to repeat the process until the confirmation for all objects is completed.

On the other hand, in step S706, when the confirmation for all objects is completed (YES), the running contrast-output mode is determined as the output mode of the printer driver. In the high-contrast output mode, the bit-depth for color conversion is set at 12 bits, whereas in the low-contrast output mode, the bit-depth for color conversion is set at 8 bits.

Depending on the determined output mode, the printer driver switches to an operation for generating PDL-data processable by the image input/output system 100. In other words, in the second embodiment, the PDL-data generated in the high-contrast output mode is given a 12-bit-depth color property. With the production of the PDL-data, parameter information is produced as information for the "high-contrast output mode" and is added to the PDL-data. On the other hand, the PDL-data generated in the low-contrast output mode is given an 8-bit-depth color property. Likewise, with the production of the PDL-data, parameter information is produced as information for the "low-contrast output mode" and is added to the PDL-data.

According to the second embodiment, the printer driver confirms the output bit-depth of the picture object in the print-job data and compares the output bit-depth with the processing bit-depth of the image-processing device in the low-contrast output mode. Thus, if the output bit-depth of the print-job data is lower than the processing bit-depth, low-contrast properties may be given to the print-job.

Third Embodiment

According to the image input/output system 100, even if the contrast properties are not added to the print-job data by the printer driver, the output mode can be switched between high-contrast and low-contrast output modes by determining the actual properties of the picture object of the PDL-data in the print-job data.

In detail, the switching of the output modes may be performed by using either the actual color properties of the picture object in the PDL-data or the actual contrast properties of the picture object. For example, if the PDL-data includes at least one object to be rendered in color, an accurate color reproduction is necessary and the bit-depth is set at 12 bits to perform color conversion in a high-contrast output mode. On the other hand, if the PDL-data does not include objects to be rendered in color, a high-speed processing is preferred rather than an accurate color reproduction. Thus, the bit-depth is set at 8 bits to perform color conversion in a low-contrast output mode.

Some PDL-data includes a specific bit-depth for the contrast properties of the actual picture object. A PostScript image-operator requires specific bits/sample properties and the effective values are 1, 2, 4, 8, and 12. If the PDL-data written in PostScript includes an image object and the values 1, 2, 4, and 8 are specified for the bits/sample properties, the bit-depth is set at 8 bits for color conversion in the low-contrast output mode. If the value 12 is specified for the bits/sample properties, the bit-depth is set at 12 bits for color conversion in the high-contrast output mode.

According to the third embodiment, even if the print-job data is not provided with contrast properties, the output modes can be switched between high-contrast and low-contrast output modes by determining whether the object in the PDL-data is color or monochrome.

Furthermore, if the picture object in the PDL-data is a document-text object and the specified color is black, a color-space conversion is generally not necessary. To satisfy such conditions, a non-color-space-conversion mode is provided to achieve further high-speed processing. In other words, according to the image-processing device, if the picture object in the print-data is to be rendered using a certain property and color (for example, a document-text object in black), the image data may be generated without calculating the color-space conversion of the print-data.

Furthermore, the processing bit-depth for the color-space-conversion calculation may be made selectable, and one or more contrast-output modes, including the high-contrast and low-contrast output modes, may be provided from which one mode may be selected.

Other Embodiments

In the above embodiments, the PDL-analyzer 110c calculates the color-space conversion and generates image data. The generated image data is then stored in the queue 110d. As another embodiment, the PDL-analyzer 110c may calculate the color-space conversion and generate an intermediate picture object. In this case, the intermediate picture object is stored temporarily in the queue 110d and is then converted to image data.

In other words, according to the image-processing device, the color-space conversion for the print-data stored in the buffer 110b is calculated to generate the intermediate picture object. The intermediate picture object is then stored in the queue 110d. The color-space conversion is then calculated for the intermediate picture object to generate the image data. Finally, the printer unit 300 outputs the image data onto a medium.

The present invention may be applied either to a system composed of multiple units, such as a host computer, an interface unit, a reader unit, a printer unit, a finisher, and a peripheral memory unit, or to a device that includes a single unit.

The present invention may include a modification where software program code is supplied for a computer in a system or a device connected to the units so that the units are operated to implement the functions of the above embodiments. Then each unit is operated by the program stored in the computer (CPU (central processing unit) and MPU (microprocessor unit)) of the system or the device.

In this case, the software program code implements the functions of the above embodiments, and therefore, the program code and supplying means for supplying the program code to a computer, which may be, for example, a storage medium (a recording medium) storing the program code therein, may be included in the technical scope of the present invention. As a storage medium for storing the program code, a floppy disk, a hard disk, an optical disk, a magnetic optical disk, a CD-ROM, a magnetic tape, a non-volatile memory card, and a ROM, for example, may be used.

Accordingly, the supplied program code may be operated by the computer to implement the functions of the above embodiments. Alternatively, the program code may operate in combination with, for example, an operating system (OS) or other application software of the computer. As mentioned above, the program code is included within the scope of the present invention.

The present invention may further include a modification where the supplied program code is stored in a memory included in an enhancement board or an enhancement unit connected to a computer. In response to a command given by the program code, a CPU, for example, provided in the enhancement board or the enhancement unit performs the overall or partial process, whereby the functions of the above embodiments may be implemented.

Accordingly, the present invention achieves output with high reproducibility in a high-contrast output mode, and high-speed output in a low-contrast output mode.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for performing a color conversion on print data and outputting the print data on which the color conversion is performed to a printer unit, the image processing apparatus comprising:

a first determining unit configured to determine whether monochrome output has been specified by a user;

a second determining unit configured to determine whether each picture object included in the print data is a color object;

a setting unit configured to set, for the print data, a first mode for calculating the color conversion for the print data at a high bit-depth or a second mode for calculating the color conversion at a low bit-depth based on results of the determinations by the first determining unit and the second determining unit; and a color conversion unit configured to perform the color conversion on the print data based on a mode set by the setting unit and to generate output data to be output by the printer unit, wherein the setting unit is configured to set the second mode when the first determining unit determines that the monochrome output has been specified by the user, wherein the setting unit is configured to set the first mode when the first determining unit determines that the monochrome output has not been specified by the user and the second determining unit determines that the color object is included in the print data, and wherein the setting unit is configured to set the second mode when the first determining unit determines that the monochrome output has not been specified by the user and the second determining unit determines that the color object is not included in the print data.

2. The image processing apparatus according to claim 1, wherein the image processing apparatus comprises:

a printer driver; and a controller, the printer driver comprising:

the first determining unit;

the second determining unit;

the setting unit; and a print job generating unit configured to generate print-job data including the print data and information indicating the set mode, and the controller comprising:

an input unit configured to input the print-job data; and the color conversion unit.

3. An image processing method for an image processing apparatus to perform a color conversion on print data and to output the print data on which the color conversion is performed to a printer unit, the image processing method comprising:

obtaining user input from an input unit;

determining whether monochrome output has been specified by the user input obtained from the input unit;

determining whether each picture object included in the print data is a color object;

setting, for the print data, a first mode for calculating the color conversion for the print data at a high bit-depth or a second mode for calculating the color conversion at a low bit-depth based on results of the determination of whether monochrome output has been specified and the determination of whether each picture object included in the print data is a color object; and performing the color conversion on the print data based on a mode set, the mode being set to the second mode when it is determine that the monochrome output has been specified by the user, the mode being set to the first mode when it is determined that the monochrome output has not been specified by the user and it is determined that that the color object is included in the print data, the mode being set to the second mode when it is determined that the monochrome output has not been specified by the user and it is determined that that the color object is not included in the print data;

generating output data to be output by the printer unit; and outputting the generated output data on which the color conversion has been performed to a printer unit.

4. A computer-readable medium having computer-executable instructions stored thereon for an image processing apparatus to perform an image processing method that performs a color conversion on print data and outputs the print data on which the color conversion is performed to a printer unit, the image processing method comprising:

obtaining user input from an input unit;

determining whether monochrome output has been specified by the user input obtained from the input unit;

determining whether each picture object included in the print data is a color object;

setting, for the print data, a first mode for calculating the color conversion for the print data at a high bit-depth or a second mode for calculating the color conversion at a low bit-depth based on results of the determination of whether monochrome output has been specified and the determination of whether each picture object included in the print data is a color object; and performing the color conversion on the print data based on a mode set, the mode being set to the second mode when it is determine that the monochrome output has been specified by the user, the mode being set to the first mode when it is determined that the monochrome output has not been specified by the user and it is determined that that the color object is included in the print data, the mode being set to the second mode when it is determined that the monochrome output has not been specified by the user and it is determined that that the color object is not included in the print data;

generating output data to be output by the printer unit; and outputting the generated output data on which the color conversion has been performed to a printer unit.

* * * * *